(12) United States Patent
Zhao et al.

(10) Patent No.: US 8,869,275 B2
(45) Date of Patent: Oct. 21, 2014

(54) SYSTEMS AND METHODS TO DETECT AND RESPOND TO DISTRIBUTED DENIAL OF SERVICE (DDOS) ATTACKS

(71) Applicants: Yujie Zhao, Reston, VA (US); Suresh Bhogavilli, Reston, VA (US); Roberto Guimaraes, Reston, VA (US)

(72) Inventors: Yujie Zhao, Reston, VA (US); Suresh Bhogavilli, Reston, VA (US); Roberto Guimaraes, Reston, VA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 13/688,069

(22) Filed: Nov. 28, 2012

(65) Prior Publication Data
US 2014/0150095 A1 May 29, 2014

(51) Int. Cl.
H04L 29/06 (2006.01)

(52) U.S. Cl.
CPC ............ H04L 29/06 (2013.01); H04L 63/1458 (2013.01); H04L 63/0236 (2013.01)
USPC ........................................................ 726/22

(58) Field of Classification Search
None
See application file for complete search history.

(56) References Cited

U.S. PATENT DOCUMENTS

| | | | |
|---|---|---|---|
| 7,301,899 B2 | 11/2007 | Goldstone | |
| 7,363,513 B2 | 4/2008 | Keohane et al. | |
| 7,373,524 B2 | 5/2008 | Motsinger et al. | |
| 7,404,211 B2 | 7/2008 | Kanno et al. | |
| 7,436,770 B2 | 10/2008 | Sterne et al. | |
| 7,996,537 B2 * | 8/2011 | Nesz et al. | 709/227 |
| 8,046,827 B2 | 10/2011 | Corella | |
| 8,321,563 B2 * | 11/2012 | Cobb | 709/224 |
| 2002/0166063 A1 | 11/2002 | Lachman, III et al. | |
| 2004/0064738 A1 | 4/2004 | Kanno et al. | |
| 2007/0073660 A1 * | 3/2007 | Quinlan | 707/3 |
| 2010/0212005 A1 | 8/2010 | Eswaran et al. | |
| 2011/0016523 A1 | 1/2011 | Oh et al. | |
| 2012/0259833 A1 * | 10/2012 | Paduroiu | 707/709 |
| 2013/0104230 A1 * | 4/2013 | Tang et al. | 726/23 |

FOREIGN PATENT DOCUMENTS

| | | | |
|---|---|---|---|
| DE | EP 2009864 A1 * | 1/2009 | |
| WO | 2009039434 A2 | 3/2009 | |

OTHER PUBLICATIONS

Broadhead, Steve, "Add Intelligence to Your Network with New Approaches to Layer 7 Traffic Management," Computer Weekly, United Kingdom, Mar. 2005, retrieved from http://www.computerweekly.com/feature/Add-intelligence-to-your-network-with-new-approaches-to-Layer-7-traffic-management, 5 pages.

Extended European Search Report issued Feb. 4, 2014 in EP Application No. 13193761.7 filed Nov. 21, 2013, 8 pages.

* cited by examiner

Primary Examiner — Jeffrey Pwu
Assistant Examiner — Wasika Nipa
(74) Attorney, Agent, or Firm — MH2 Technology Law Group, LLP

(57) ABSTRACT

Embodiments relate to systems, devices, and computer-implemented methods for mitigating Distributed Denial of Service ("DDoS") attacks. The method can include receiving, by a server, a response message from an application server. The method can further include determining a source internet protocol (IP) address associated with the source client based on a request message received from a source client. The request message received from the source client corresponds to the response message received from the application server. In addition, the method can include identifying, by the server, a plurality of counters associated with the source IP address, and identifying, by the server, a response type of the response message. Further, the method can include causing a value of at least one of the plurality of counters to change based on the response message and the response type.

21 Claims, 5 Drawing Sheets

US 8,869,275 B2

SYSTEMS AND METHODS TO DETECT AND RESPOND TO DISTRIBUTED DENIAL OF SERVICE (DDOS) ATTACKS

TECHNICAL FIELD

The present disclosure relates generally to systems and methods for detecting and responding to cyber attacks against servers and web servers and, more particularly, to systems and methods for detecting and responding to Distributed Denial of Service (DDoS) attacks, such as dictionary attacks.

BACKGROUND

The Internet, also commonly referred to as the "web," is a global system of interconnected networks that operate according to the Internet Protocol suite, allowing access to an extensive range of information that can be retrieved and accessed using the hypertext transfer protocol (HTTP). The Internet operates in a client-server format that distributes computing tasks and responsibilities between the service or resource providers, commonly referred to as "web servers," and service requesters, called clients. Typically, web servers are configured to accept requests from all clients, and the HTTP request generally provides little information about the requesting client that would enable the web servers to determine the nature of the client's intentions in making the request. While this open communication model serves to facilitate the transfer of knowledge and information, it may also leave web servers vulnerable to "cyber attacks," such as denial-of-service (DoS) attacks and distributed denial-of-service (DDoS) attacks.

In a DoS attack, a single client may attempt to overwhelm a server by sending a large number of requests to the server in rapid succession. As a result, an attacked web server may be slow or unable to respond to legitimate requests due to the burdens imposed on the server when servicing a flood of requests from a single malicious client.

The DDoS attack is a variation of the DoS attack. In a DDoS attack, rather than having a single client make all of the nuisance requests to the server, the attacker utilizes a network of different clients to simultaneously issue requests to the server. Such a network of requesting clients may be at the attacker's disposal, for example, by virtue of an in-place "botnet" in which hundreds or thousands of normal users' computers are infected by malware. This malware may be programmed to respond to commands issued by a central machine or authority, colloquially known as a "bot master." Bot masters make use of such a collection of infected machines in order to implement a DDoS attack on a server or enterprise.

In a DDoS attack, because the flood of requests may be spread over a large number of disparate clients, each with a different IP address, it may be difficult to detect which requests originate from legitimate clients and which requests originate from malicious clients, such as compromised machines in a botnet. Thus, a server may not be able to determine which requests it should ignore and which requests it should service, because all requests may appear substantially identical over the larger pool of IP addresses. While DDoS attacks may be mitigated, conventional mitigation techniques suffer from a number of drawbacks.

There is therefore a need for methods and systems for overcoming these and other problems presented by the prior art.

SUMMARY

In one aspect of the invention, a computer-implemented method is disclosed for mitigating distributed denial of service (DDoS) attacks, comprising: receiving, by a server, a response message from an application server; determining a source internet protocol (IP) address associated with the source client based on a request message received from a source client, wherein the request message received from the source client corresponds to the response message received from the application server; identifying, by the server, a plurality of counters associated with the source IP address; identifying, by the server, a response type of the response message; and causing a value of at least one of the plurality of counters to change based on the response message and the response type.

In another aspect of the invention, a computer-implemented method is disclosed for mitigating against distributed denial of service (DDoS) attacks, comprising: receiving, by a server, a response message from an application server; determining, from a request message corresponding to the response message, a source internet protocol (IP) address associated with a source client; locating, by the server, a plurality of counters associated with the source IP address, including a rolling window counter (RWC) that is used to track a number of total requests received from the source IP address, a discrete bad request counter (DBRC) that is used to track a number of bad requests received from the source IP address, and a consecutive bad request counter (CBRC) that is used to track a number of consecutive bad requests received from the source IP address; identifying, by the server, a response type of the response message; determining, by the server, if the response message is associated with a malicious request based on the response type and the source IP address; and causing a value of at least one of the plurality of counters to change based on the determining if the response message is associated with the malicious request.

In another aspect of the invention, a computer-implemented method is disclosed for mitigating distributed denial of service (DDoS) attacks, comprising: receiving, by a server, a response message associated with a source client, wherein the response message is one of a hypertext transfer protocol (HTTP) message or a hypertext transfer protocol secure (HTTPS) message; determining, from a request message corresponding to the response message, a source internet protocol (IP) address associated with the source client; locating, by the server, a plurality of counters associated with the source IP address, the plurality of counters including a discrete bad request counter (DBRC) that is used to track a number of bad requests received from the source IP address, and a consecutive bad request counter (CBRC) that is used to track a number of consecutive bad requests received from the source IP address; identifying, by the server, a status of the response message; determining, by the server, if the response message is associated with a malicious request based on the status of the response message and the source IP address; causing the value of at least one of the plurality of counters to change based on the determining if the response message is associated with the malicious request; and performing a mitigating action in connection with the source IP address based on the determining if the response message is associated with the malicious request and at least one of a value of the DBRC and a value of the CBRC.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are example and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DETAILED DESCRIPTION

Figure 1:
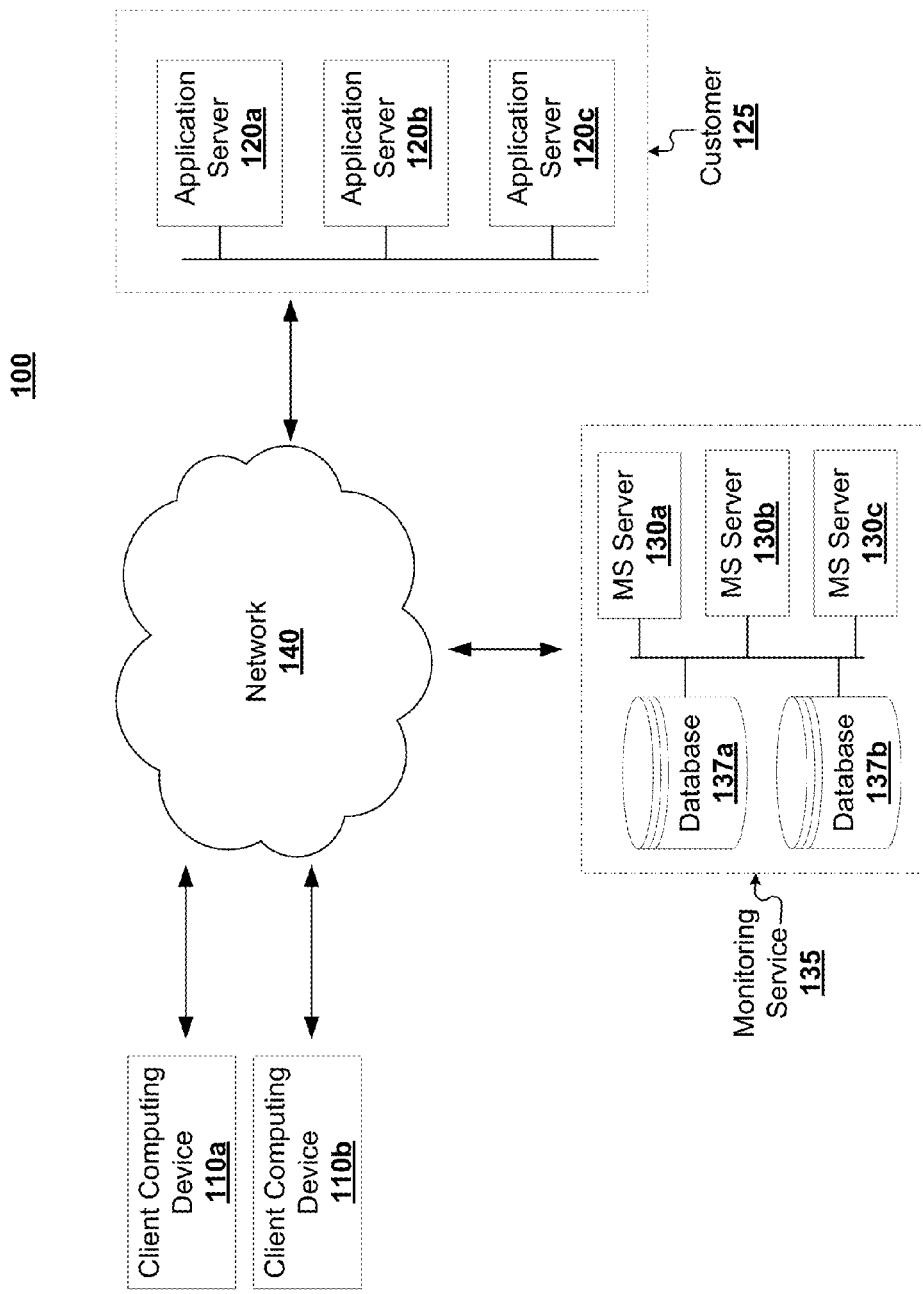
FIG. 1 is a diagram illustrating example communications between application servers and clients, consistent with certain disclosed embodiments.

Dictionary attacks are commonly used by hackers in DDoS attacks, target backend servers by sending requests with invalid Uniform Resource Locators (URLs) or by attempting to log in using invalid user names or passwords. Dictionary attacks differ from typical request flood attacks in that each request is unique and, thus, do not lend themselves to being handled by web caching servers. As a result, the attack directly taxes the backend servers, consuming computational resources of backend servers and causing outages of the backend servers. The disclosed embodiments detect and mitigate DDoS attacks, such as dictionary attacks.

To overcome the challenges of these types of attacks, the disclosed embodiments identify attackers, not only based on requests they send to backend web servers, but also based on the responses they receive from the backend web servers. As a result, the disclosed techniques may be scalable (both greater and smaller), thereby consuming a minimal amount processing resources and requiring less processing time. Additionally, the described embodiments may enable detection of coordinated attacks from motivated attack groups consisting of many volunteer activists and individual attacks that randomly rotate through a number of user-configured request patterns.

The following detailed description refers to the accompanying drawings. Wherever possible, the same reference numbers are used in the drawings and the following description to refer to the same or similar parts. While several example embodiments and features are described herein, modifications, adaptations, and other implementations are possible, without departing from the spirit and scope of the claimed invention. Accordingly, the following detailed description does not limit the invention. Instead, the proper scope of the invention is defined by the appended claims.

FIG. 1 is a diagram illustrating communications between one or more example application servers and one or more client computing devices, consistent with certain disclosed embodiments. As shown in FIG. 1, an example system 100 may include or more client or computing devices 110 (e.g., client computing device 110a, client computing device 110b, and client computing device 110c), one or more application servers 120 (e.g., application server 125a, application server 125b, and application server 125c), which may be owned, operated, leased and/or managed by customer 125, one or more monitoring service (MS) servers 130 (e.g., MS server 130a, MS server 130b, and MS server 130c) and one or more databases (e.g., database 137a, and database 137b), which may be owned, operated, and/or managed by monitoring service 135, and network 140.

Client computing devices 110 may be any type of electronic device and/or component configured to execute one or more processes, many of which are known in the art. Client computing devices 110 can include, by way of example and not limitation, clients, desktop computers, laptop computers, network computers, workstations, personal digital assistants (PDA), tablet PCs, telephony devices, wireless base stations, wireless access devices, pagers, musical devices, routers, hubs, cameras, printers, copiers, scanners, projectors, alarms, lights, home entertainment systems, audio/visual systems, home security devices, intercoms, domestic robots, appliances, HVAC systems, etc., or any component or sub-component of another computing device 110 or assemblage, such as, for example, a car, a train, a plane, a boat, etc. Although not illustrated, client computing devices 110 can also include servers and/or databases. Client computing devices 110 may be configured to transmit and/or receive information to and/or from other client computing devices 110, application servers 120, MS servers 130, and/or databases 137 directly and/or indirectly via any combination of wired and/or wireless communication systems, method, and devices, including, for example, network 140.

Application servers 120 may comprise commercial web servers that service hypertext transfer protocol (HTTP) requests and/or hypertext transfer protocol secure (HTTPS) requests from client computing devices 110 for web pages hosted by the application servers 120. Although application servers 120 may operate one or more applications or provide one or more public-facing network services, application servers 120 may comprise any servers capable of being subjected to a cyber attack, such as a DDoS attack, and need not operate any particular application or host any particular services. In addition, although application servers 120 may comprise commercial web servers that are configured to receive and service legitimate HTTP requests, application servers 120 subject to a cyber attack can and frequently do receive and respond to HTTP requests that are not related to web pages hosted by application servers 120.

Application servers 120 can be physical computers, or computer systems, configured to run one or more services to support users of other computers on one or more networks and/or computer programs executing on physical computers, or computer systems, and configured to serve the requests of other programs that may be operating on one or more servers (not shown) or on other computing devices, such as client computing devices 110. Application servers 120 can include, by way of example and not limitation, communication servers, database servers, fax servers, file servers, mail servers, print servers, name servers, web servers, proxy servers, gaming servers, etc. In some aspects, application servers 120 may be configured to transmit and/or receive information to and/or from client computing devices 110, other servers (e.g., application servers 120, MS servers 130, Internet Service Provider (ISP) servers (not shown), etc.), and/or databases (not shown) directly and/or indirectly via any combination of wired and/or wireless communication systems, method, and/or devices, including, for example, network 140.

MS servers 130 may be configured to monitor application servers 120. In some embodiments, MS servers 130 may monitor application servers 120 for the purpose of determining whether application servers 120 are receiving and responding to network communications and/or are otherwise functioning in a normal or expected manner or whether application servers 120 are functioning in an abnormal manner that may indicate the presence of a DoS attack. As used herein, a "DoS attack" may refer to a traditional DoS attack, in which all malicious requests or communications originate from a single device, a DDoS attack, in which multiple, separate devices may participate in the attack, and/or any other type of cyber attacks.

MS servers 130 may include one or more physical servers, or server systems, and/or one or more proxy servers, each configured to run one or more services to support other computers or computer systems, such as, for example, application servers 120. In some embodiments, MS servers 130 may be configured to monitor one or more application servers 120. MS servers 130 may also be configured to prevent, detect, and respond to DoS attacks targeting the monitored one or more application servers 120. In certain embodiments, the same server devices may perform the roles of physical MS servers 130 and/or proxy MS servers 130.

Databases 137 can be one or more computing devices configured to store databases, e.g., organized collections of data and their data structures, and/or execute database management systems, e.g., computer programs configured to control the creation, maintenance, and use of the database. Collectively, databases and their database management systems can be referred to as database systems. As used herein, database 137 can refer to databases, database management systems, and/or database systems. In some aspects, database 137 can be configured to store databases, while database management systems are stored and executed on one or more remote computing devices, such as computing devices 110, and/or one or more remote servers, such as MS servers 130. In one implementation, databases 137 can include software database programs configured to store data associated with MS servers 130 and their associated applications or processes, such as, for example, standard databases or relational databases. Databases 137 can include relationship database management systems (RDBMS) that may be configured to run as a server on MS servers 130. In some embodiments, databases 137 can be configured to transmit and/or receive information to and/or from client computing devices 110, MS servers 130, and/or other databases 137 directly and/or indirectly via any combination of wired and/or wireless communication systems, method, and/or devices, including, for example, network 140.

Network 140 may be any appropriate network or other communication link that allows communication between or among one or more computing systems and/or devices, such as, for example, client computing devices 110, application servers 120, monitoring service servers 130, and databases 137. Network 140 may be wired, wireless, or any combination thereof. Network 140 may include, for example, the Internet, a local area network, a wide area network, a WiFi network, a workstation peer-to-peer network, a direct link network, a Bluetooth connection, a bus, or any other suitable communication network or any combination thereof.

In one embodiment, a third-party mitigation service provider 135 may operate MS servers 130, which monitor application servers 120, pursuant to a commercial mitigation service provided to customer 125, which may own or operate application servers 120. Although FIG. 1 depicts MS servers 130 as communicating with application servers 120 using an indirect network connection, such as a connection through network 140, those skilled in the art will appreciate that MS servers 130 may also communicate with application servers 120 using a direct communications link or a communications link separate from network 140. MS servers 130 may be within the network path between clients 110 and application servers 120 or may be outside of the communication path.

In certain embodiments, proxy MS servers 130 may be owned or operated by a third party that provides proxy services as part of a broader DoS mitigation service. One advantage of employing a separately-owned or operated mitigation server system may be the third party service provider's ability to bear computational and connection burdens that a customer's server system could not. For example, customer 130 may be a small company that does not have the resources to operate separate proxy servers to perform mitigation services. Or, even if customer 130 also operated separate proxy servers, such proxy servers might not be able to bear the burden of a full DDoS attack. This aspect of disclosed embodiments may be contrasted with conventional systems that focus on equipping servers that are being attacked or other servers operated by the attacked entity to filter legitimate requests from malicious requests. These systems fail when filtering operations themselves are sufficient to overwhelm the owner of the attacked servers or associated proxy servers.

In the embodiment of FIG. 1, client computing devices 110 may communicate directly with application servers 120 via network 140 using standard Internet Protocols, such as HTTP, transmission control protocol (TCP), internet protocol (IP), etc. For example, HTTP requests from client computing devices 110 may be encapsulated in TCP segments, IP datagrams, and Ethernet frames and transmitted to application servers 120. In some embodiments, third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications from client computing devices 110 to application servers 120.

Figure 2:
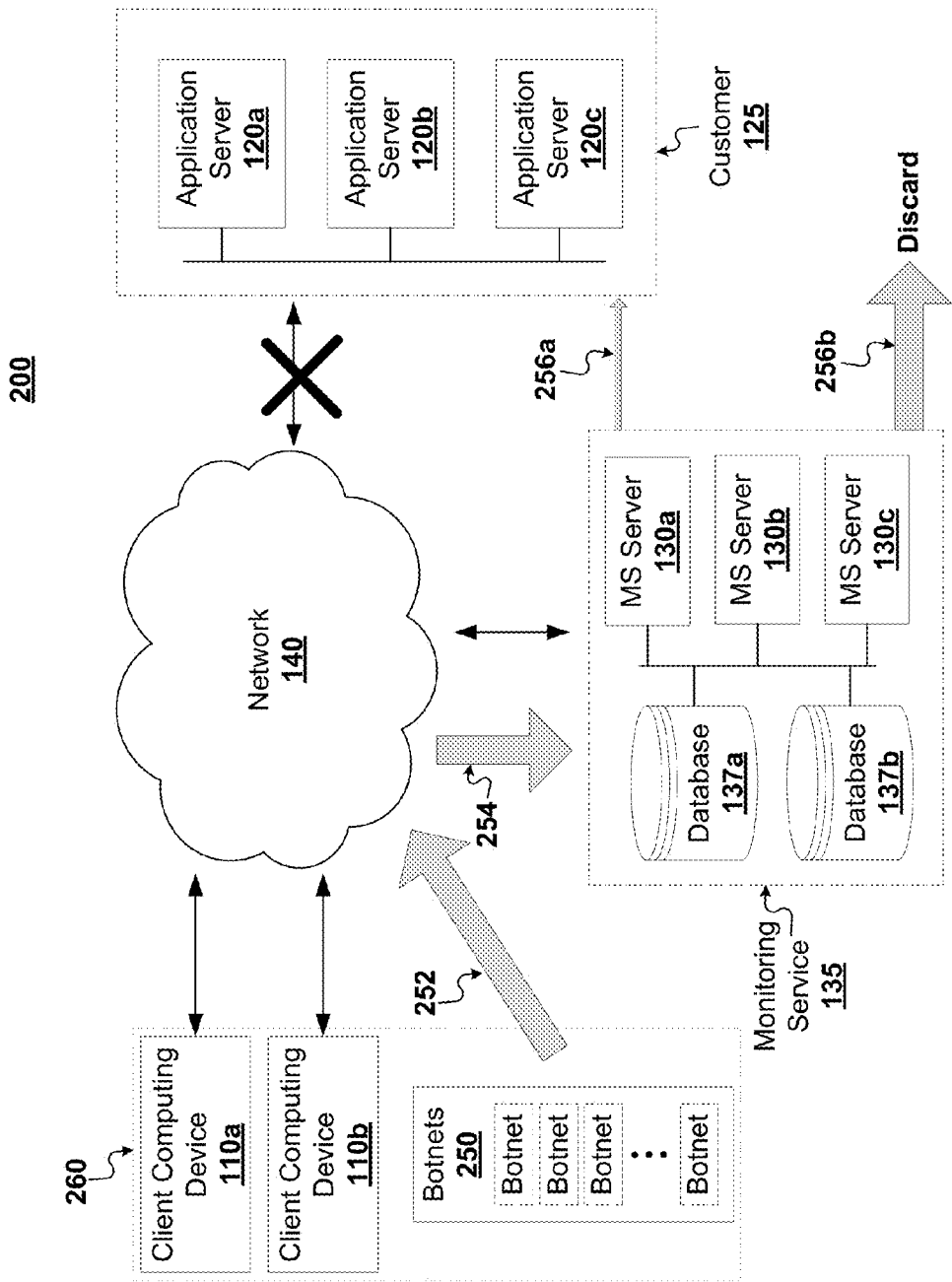
FIG. 2 is a diagram illustrating an example method of diverting traffic intended for application servers to a mitigation site in the event of a DDoS attack, consistent with certain disclosed embodiments.

FIG. 2 is a diagram illustrating an example system for diverting traffic intended for one or more application servers to a mitigation site for filtering the traffic in the event of a DoS attack, consistent with certain disclosed embodiments. As shown in FIG. 2, an example system 200 may include or more client or computing devices 110 (e.g., client computing device 110a, client computing device 110b, and client computing device 110c), one or more application servers 120 (e.g., application server 125a, application server 125b, and application server 125c), which may be owned, operated, leased and/or managed by customer 125, one or more monitoring service (MS) servers 130 (e.g., MS server 130a, MS server 130b, and MS server 130c) and one or more databases (e.g., database 137a, and database 137b), which may be owned, operated, and/or managed by monitoring service 135, and network 140. The aforementioned components of system 200 are described above in connection with FIG. 1.

In addition, the system of FIG. 2 may include botnets 250. Botnets 250 may include any number of computing devices, often numbering in the hundreds or thousands. Often, such botnets 250 include the internet-connected computing devices of average users, such as, for example, client computing devices 110, whose security defenses have been breached and control ceded to a malicious party. These internet-connected computing devices may be, in some embodiments, infected by malware that places these computing devices at the disposal of a cyber-attacker and causes the internet-connected computing devices to respond to commands issued by a central machine or authority, colloquially known as a "bot master." In FIG. 2, client computing devices 110 and botnets 250 are collectively referred to as clients 260. That is, clients 260 is used generically represent any client device seeking to communicate with application servers 120, including both legitimate sources, such as client computing devices 110, as well as malicious sources, such as botnets 250.

As shown in FIG. 2, while legitimate client computing devices 110 are making normal requests to application servers 120, malicious botnets 250 are also making requests to application servers 120. In FIG. 2, malicious traffic 252 from botnets 250 is depicted as a thick arrow, whereas traffic from legitimate client computing devices 110 is depicted as a thin arrow, to illustrate that malicious traffic 252 from botnets 250 may be significantly heavier than legitimate traffic from client computing devices 110.

In some embodiments, once a DoS attack on application servers 120 is detected, all traffic to application servers 120 may be diverted to MS servers 130 such that neither client computing devices 110, nor botnets 250, are able to establish a direct connection with application servers 120 via network 140. In some embodiments, MS servers 130 may be operated by the same third-party monitoring service provider 135 that operates MS servers 130. MS servers 130 may be within the network path between clients 110 and application servers 120 or may be outside of the path.

Traffic between network 140 and application servers 120 may be redirected to proxy MS servers 130 using a number of different techniques. For example, using features provided by the Border Gateway Protocol ("BGP"), an inter-Autonomous System routing protocol used by ISPs, proxy MS servers 130 may advertise their availability to route communications to the IP addresses associated with application servers 120 or may advertise that they themselves terminate such IP addresses, in a process known as a "BGP swing." As the result of a BGP swing, communications intended for application servers 120, such as communications from client computing devices 110a and 110b, may terminate at proxy MS servers 130 such that proxy MS servers 130 may communicate with client computing devices 110a and 110b on behalf of application servers 120, typically without detection.

Alternatively, either application servers 120 or proxy MS servers 130 may initiate a request to one or more Domain Name Service (DNS) servers to reassign domain names hosted by application servers 120 to IP addresses assigned to proxy MS servers 130. This process of DNS record alteration may additionally be facilitated or expedited if application servers 120 and/or proxy MS servers 130, or the entities associated therewith, operate authoritative DNS servers or have other primary or authoritative roles in the DNS system. Those skilled in the art will appreciate that other techniques may be used to redirect traffic intended for application servers 120 to MS servers 130, including, for example, proxy MS servers 130.

Once traffic 254, illustrated in FIG. 2 by the thick traffic arrow from network 140 to MS servers 130, has been diverted to proxy MS servers 130, proxy MS servers 130 may filter the traffic by categorizing the traffic into communications from legitimate clients 260, such as, for example, client computing devices 110, and communications from malicious clients 260, such as, for example, botnets 250 or other DoS participants. Traffic that is determined by proxy MS servers 130 to be legitimate traffic 256a may be forwarded to application servers 120, while other traffic 256b may be discarded. Alternatively and/or additionally, to avoid denying service to legitimate client incorrectly identified as malicious, some or all traffic 256b could be forwarded to application servers 120 or otherwise serviced, for example at a much lower priority than traffic 256a, a process known as "rate-limiting."

Figure 3:
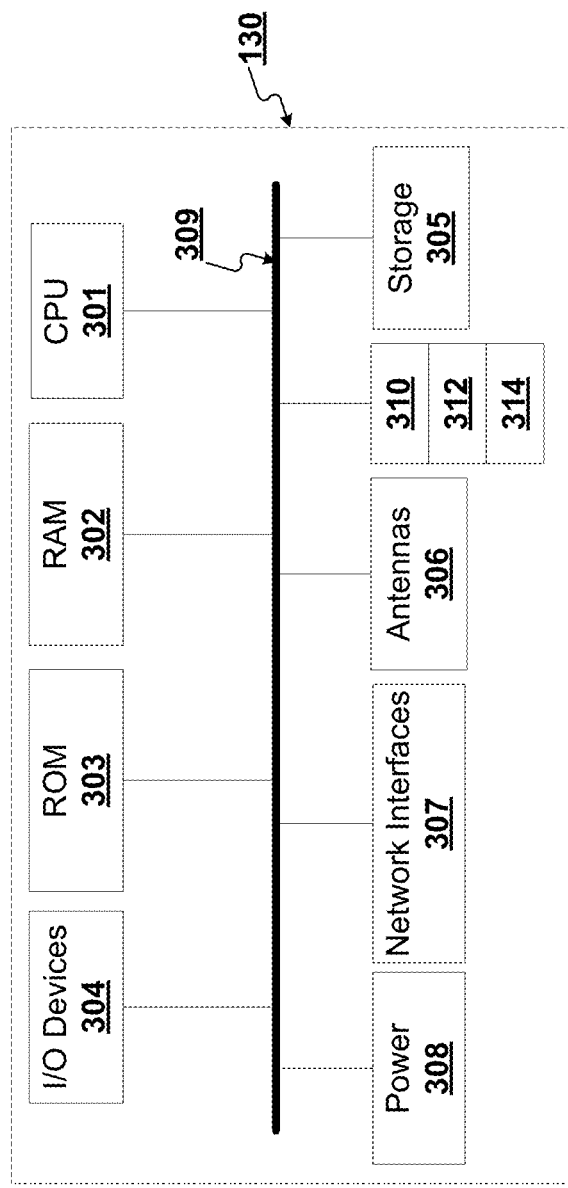
FIG. 3 is a block diagram illustrating example components of a mitigation service (MS) server, consistent with certain disclosed embodiments.

FIG. 3 is a block diagram of an example MS server 130 arranged to identify and mitigate DoS or other malicious attacks, consistent with certain disclosed embodiments. It should be readily apparent that the example MS server 130 depicted in FIG. 3 represents a generalized schematic illustration and that other components/devices can be added, removed, or modified. In one example embodiment, computing device 110 can be configured to include address translation and full virtual-memory services.

As shown in FIG. 3, each MS server 130 can include one or more of the following components: at least one central processing unit (CPU) 301 configured to execute computer program instructions to perform various processes and methods, random access memory (RAM) 302 and read only memory (ROM) 303 configured to access and store data and information and computer program instructions, I/O devices 304 configured to provide input and/or output to MS server 130 (e.g., keyboard, mouse, display, speakers, printers, modems, network cards, etc.), and storage media 305 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system 310, application programs 312 including, for example, web browser application, email application and/or other applications, and data files 314 are stored.

In addition, each MS server 130 can include antennas 306, network interfaces 307 that provide wireless and/or wire line digital and/or analog interface to one or more networks, such as network 140, over one or more network connections (not shown), a power source 308 that provides an appropriate alternating current (AC) or direct current (DC) to power one or more components of MS server 130, and a bus 308 that allows communication among the various disclosed components of MS server 130 of FIG. 3. Each of these components is well-known in the art and will not be discussed further.

Although not shown, MS server 130 can include one or more mechanisms and/or devices by which MS server 130 can perform the methods as described herein. For example, MS server 130 can include one or more encoders, one or more decoders, one or more interleavers, one or more circular buffers, one or more multiplexers, one or more de-multiplexers, one or more permuters, one or more decryption units, one or more demodulation units, one or more arithmetic logic units and/or their constituent parts, etc. These mechanisms and/or devices can include any combination of hardware and/or software components and can be included, in whole or in part, in any of the components shown in FIG. 3.

In one or more exemplary designs of MS server 130 of FIG. 3, the functions described can be implemented in hardware, software, firmware, or any combination thereof. If implemented in software, the functions can be stored as one or more instructions or code on computer-readable medium, including the computer-readable medium described above (e.g., RAM 302, ROM 303, and storage media 305).

Figure 4:
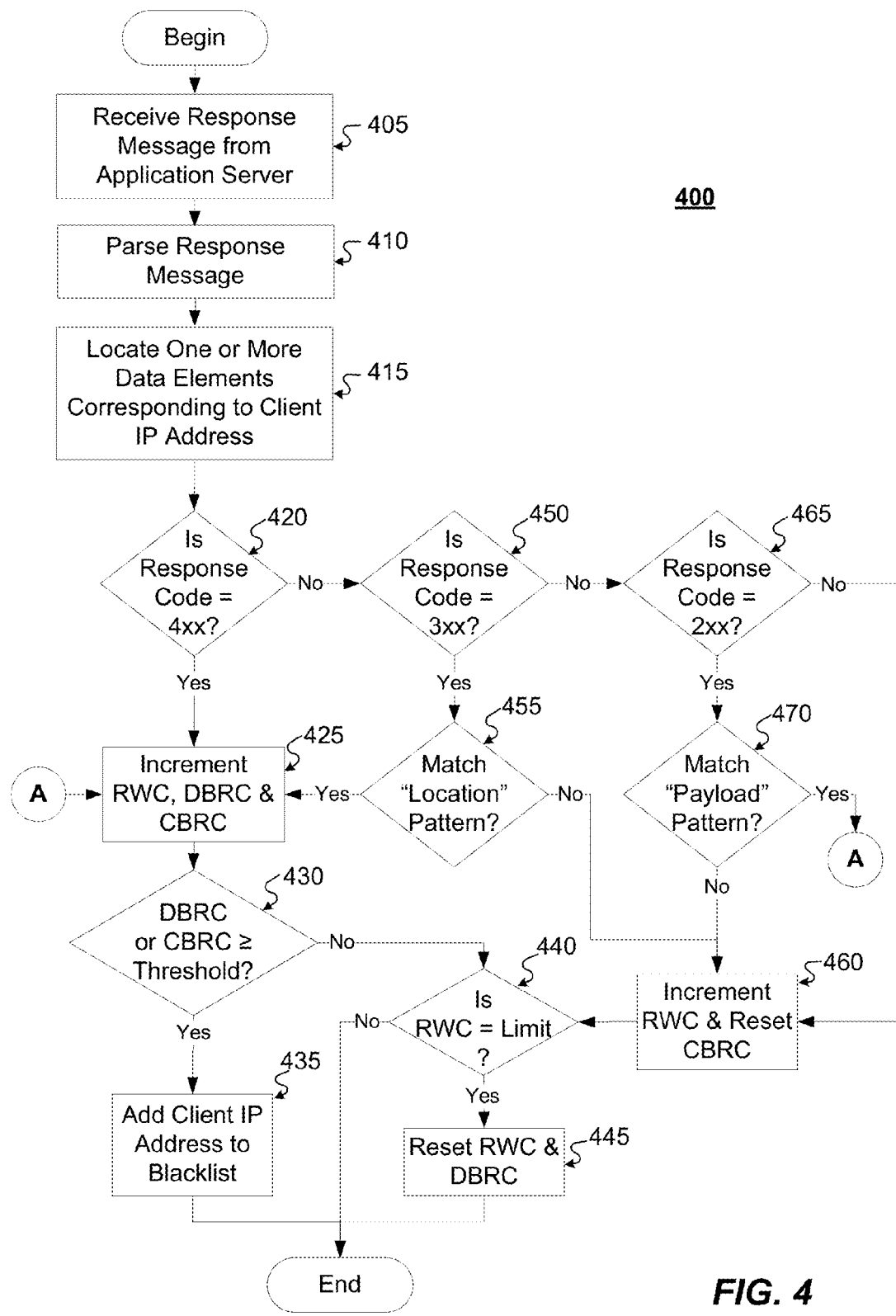
FIG. 4 is a flow diagram illustrating an example method of detecting and mitigating DoS attacks, consistent with certain disclosed embodiments.

FIG. 4 is a flow diagram illustrating an example method of detecting and responding to potentially malicious requests, consistent with certain disclosed embodiments. In some embodiments consistent with the example method of FIG. 4, in response to a detected DoS attack, direct communication between application servers 120 of FIG. 1, which may be owned or operated by customer 125, and clients 260 may have been disabled. In such embodiments, client traffic may have been diverted to one or more proxy MS servers 130 to identify legitimate requests from client computing devices 110 and malicious requests from, for example, botnets 250. Specifically, FIG. 4 illustrates a flowchart 400 consistent with example implementations of the present disclosure in which traffic from all clients 260, including requests from apparently legitimate sources (e.g., client computing devices 110) and requests from apparently malicious sources (e.g., botnets 250), as well as the corresponding responses from application servers 120, are routed through one or more proxy MS servers 130. As used herein, one or more proxy MS servers 130 may be referred to as proxy MS server 130.

As shown in flowchart 400, proxy MS server 130 may receive a response message from one or more of application servers 120 (405). The response message may be sent from application servers 120 to client 260 via proxy MS server 130 in response to a request from client 260. The request from client 260 may be, for example, a URL request, a user ID request, a password request, etc. The response message received by proxy MS server 130 may be an HTTP response message, an HTTPS response message, etc.

Proxy MS server 130 may parse the response message, including any headers and payload, received from application servers 120 (410). In some embodiments, proxy MS server 130 may parse the response message to identify the IP address corresponding to requesting client 260. The IP address may be the IP address assigned to the requesting client 260 or it may be the IP address of another device that operates between client 260 and application servers 120, such as, for example, a proxy server, a network address translation (NAT) device, a port address translation (PAT) device, etc. Proxy MS server 130 may further parse the response message to obtain other information, such as, for example, a response status code, existence of a location header and/or location information, header patterns, existence of a payload and/or payload contents, payload patterns, whether or not compression is used, existence of key phrases, combinations of random ids and fixed messages, response and/or payload size, etc. Although FIG. 4 illustrates a single parsing of the response message received by MS server 130, the received response message may be parsed iteratively or repeatedly, as desired or appropriate.

After proxy MS server 130 identifies an IP address corresponding to requesting client 260, proxy MS server 130 may locate one or more data elements corresponding to the identified IP address (415). In some embodiments, proxy MS server 130 may have previously determined that the identified IP address is malicious and associated the identified IP address with a unique data element, such as, for example, an IPNode data element. In such embodiments, proxy MS server 130 may locate the data element previously associated with the identified IP address. In other embodiments, proxy MS server 130 may determine for the first time that the identified IP address is potentially malicious and create a new association between the identified IP address and a unique data element, such as, for example, a unique IPNode data element. Each unique data element (e.g., IPNode) may, in turn, have one or more corresponding data elements, such as, counters and/or timers that are also associated with the identified IP address. For example, in certain embodiments, each IPNode data element may have a request window counter (RWC), a discrete bad request counter (DBRC), and a consecutive bad request counter (CBRC), each corresponding to a same source IP address.

In some embodiments, the RWC may be used to track the number of requests received from a source IP address that is associated with a particular IPNode, and the RWC may increment by one each time a request is received from that IP address. The DBRC may be used to track the number of bad requests received from a source IP address associated with the particular IPNode, and the DBRC may increment by one for each bad request. The CBRC may be used to track the number of consecutive bad requests received from a source IP address associated with the particular IPNode, and the CBRC may increment by one for each consecutive bad request. In embodiments in which there is a valid or legitimate request received between two potentially malicious requests from the same IP address, the CBRC will be reset to zero. While three counters are specifically identified herein, one skilled in the art may use other and/or different counters to perform the systems and methods disclosed herein.

In some embodiments, the RWC may have an associated predetermined or preconfigured limit value, such as, for example, a positive integer value, which is used to create a "rolling window." In other words, the associated predetermined or preconfigured RWC limit value may be a static, positive integer value that is used as a denominator in a function represented by DBRC/RWC. In such instances, the combination of RWC and DBRC creates a continuous and rolling representation of the number of discrete bad requests among a total number of requests received from a same IP address. For example, if the predetermined or preconfigured RWC limit value is 10, then the DBRC value may reflect the number of discrete bad requests among the most recent 10 consecutive requests. In other embodiments, when RWC counter is equal to the predetermined or preconfigured limit value, the DBRC value may be reset to zero.

Additionally, the DBRC and the CBRC may each have one or more corresponding and respective predetermined and/or preconfigured threshold values. In some embodiments, MS proxy server 130 may use the respective, predetermined and/or preconfigured threshold values corresponding to DBRC and CBRC to determine if a request originating from an IP address associated with requesting client 260 is malicious. Thus, for example, if proxy MS server 130 determines that the value of the DBRC exceeds one or more of its predetermined and/or preconfigured threshold values, MS server 130 may determine that the request from client 260 is malicious. Additionally and/or alternatively, if proxy MS server 130 determines that the value of the CBRC exceeds one or more of its predetermined and/or preconfigured threshold values, MS server 130 may determine that the request from client 260 is malicious. In certain embodiments, when proxy MS server 130 determines that the request from client 260 is malicious, the IP address corresponding to requesting client 260 may be determined to be a malicious source IP address. As a result, proxy MS server 130 may perform a mitigation action, such as, for example, adding the IP address corresponding to requesting client 260 to a blacklist, dropping current and/or future requests from the same client 260 and/or IP address associated with the same client 260, etc. In certain embodiments, the IP address corresponding to requesting client 260 may remain on the blacklist for a predetermined or preconfigured period of time. In other embodiments, the IP address corresponding to requesting client 260 may remain on the blacklist for a predetermined period of time that is further determined or based upon information associated with the response message transmitted from application servers 120 and received by MS server 130.

Proxy MS server 130 may evaluate the received response to determine if the response status code is a 4xx status code (420). In certain embodiments, proxy MS server 130 may evaluate the received response to determine if the 4xx status code is a 4xx status code of interest. For example, in some embodiments, proxy MS server 130 may determine that 400, 404, and 410 response status codes are 4xx status codes of interest and all other 4xx status codes may be ignored. Generally, 4xx status codes are used for apparent client errors, such as, for example, to signify that the request contains bad syntax or otherwise cannot be fulfilled. The following table is provided as a representative example of possible 4xx status code. The following table is not intended to be a comprehensive list of all 4xx status code, nor is it intended to provide a list of 4xx status codes deemed to be of interest.

TABLE 1

Example 4xx Status Codes and Descriptions

| Status Code Value | Status Code Description |
| --- | --- |
| 400 | Bad Request |
| 401 | Unauthorized |
| 403 | Forbidden |
| 404 | Not Found |
| 405 | Method Not Allowed |
| 406 | Not Acceptable |
| 408 | Request Timeout |
| 409 | Conflict |
| 410 | Gone |
| 411 | Length Required |
| 413 | Request Entity Too Large |
| 414 | Request-URI Too Long |
| 415 | Unsupported Media Type |
| 417 | Expectation Failed |
| 423 | Locked |
| 424 | Method Failure |
| 425 | Unordered Collection |
| 426 | Upgrade Required |
| 429 | Too Many Requests |
| 431 | Request Header Fields Too Large |
| 444 | No Response |

If proxy MS server 130 determines that the response code of the response received from application server 120 is a 4xx status code of interest (420, Yes), MS server 130 may increment the values of RWC, DBRC and CBRC (425). Proxy MS server 130 may then evaluate the incremented values of each of DBRC and CBRC to determine if the incremented value of DBRC and/or the incremented value of CBRC is equal to or greater than its respective one or more predetermined and/or preconfigured threshold values (430). If proxy MS server 130 determines that the value of DBRC and/or the value of CBRC is equal to or greater than its respective one or more predetermined and/or preconfigured threshold values (430, Yes), MS server 130 may add the IP address corresponding to source client 260 to a blacklist (435). Additionally and/or alternatively, proxy MS server 130 may perform one or more other mitigation actions, such as, for example, dropping current and/or future requests from the source client 260 and/or IP address associated with the source client 260, etc.

In some embodiments, rather than incrementing the values of DBRC and CBRC, MS servers 130 may set initial values for DBRC and CBRC. In such embodiments, proxy MS server 130 may decrement the values of DBRC and CBRC when the proxy MS server 130 determines that the response code of the response received from application servers 120 is a 4xx status code. Proxy MS server 130 may further evaluate the decremented value of DBRC and/or the decremented value of CBRC to determine if the decremented value of DBRC and/or the decremented value of CBRC is equal to or less than its respective one or more predetermined and/or preconfigured threshold values (430). In such example instances, when proxy MS server 130 determines the value of DBRC and/or the value of CBRC is equal to or less than their respective one or more predetermined and/or preconfigured threshold values (430, Yes), the request from client 260 will be treated as a valid request. In some embodiments, MS server 130 may increment the value of RWC and stop further processing of the response message (End). In other embodiments in which the value of RWC is a static value, proxy MS server 130 may not increment the value of RWC, but may stop further processing of the response message (End).

In still further embodiments, DBRC and/or CBRC may have multiple predetermined and/or preconfigured thresholds, and proxy MS server 130 may add an IP address corresponding to requesting client 260 to the blacklist when it determines that the value of DBRC is greater than or equal to a first threshold and the value of CBRC is greater than or equal to a second threshold value (or vice versa). Any combination of incrementing and/or decrementing the values of DBRC and CBRC, and comparing the incremented and/or decremented values of DBRC and CBRC with one or more upper and/or lower threshold values may be used without departing from the spirit or scope of the disclosed embodiments.

In some embodiments, if proxy MS server 130 determines that the value of DBRC and/or the value of CBRC is not equal to or greater than their respective one or more predetermined and/or preconfigured threshold values (430, No), proxy MS server 130 may evaluate the value of RWC to determine if the value of RWC is equal to a limit (440). In such embodiments, the limit may be a predetermined and/or a preconfigured integer value representing the number of consecutive requests, whether legitimate or malicious, received from a requesting client 260. If the value of RWC is equal to the limit (440, Yes), MS server 130 may reset the values of RWC and DBRC to zero (445). If, however, the value of RWC is not equal to the limit (440, No), the request from client 260 will be treated as a valid request, and MS server 130 may stop further processing of the response message (End). In embodiments in which the value of RWC is incremented by one for each request, the limit may be an upper limit, whereas in embodiments in which the value of RWC is decremented by one, the limit may be a lower limit. In some embodiments, when proxy MS server 130 ends processing of the received message, proxy MS server 130 may forward the received message to the intended recipient, such as, for example, source client 260.

If proxy MS server 130 determines that the response status code of the response received from application server 120 is not a 4xx status code of interest (420, No), MS server 130 may evaluate the received response message to determine if the response status code is a 3xx status code (450). In certain embodiments, proxy MS server 130 may evaluate the received response to determine if the 3xx status code is a 3xx status code of interest. For example, in some embodiments, MS server 130 may determine that 301 and 302 response status codes are of interest, and all other 3xx status codes may be ignored. Generally, the 3xx status codes are often referred to as redirection status codes and may be used to signify that the client may need to take further action in order to complete the request. The following table is provided as a representative example of possible 3xx status code. The following table is not intended to be a comprehensive list of all 3xx status code, nor is intended to provide a list of 3xx status codes deemed to be of interest.

TABLE 2

Example 3xx Status Codes and Descriptions

| Status Code Value | Status Code Description |
|---|---|
| 300 | Multiple Choices |
| 301 | Moved Permanently |
| 302 | Found |
| 303 | See Other |
| 304 | Not Modified |
| 305 | Use Proxy |
| 307 | Temporary Redirect |
| 308 | Permanent Redirect |

If proxy MS server 130 determines that the response status code of the response message is a 3xx status code of interest (450, Yes), proxy MS server 130 may evaluate the "location" header data of the response message to determine if it matches a predetermined and/or preconfigured pattern (455). In some embodiments, proxy MS server 130 may examine the "location" header data to determine if the header contains a preconfigured regular expression (regex) pattern, such as, for example, "404," "not found," etc.

If proxy MS server 130 determines that the "location" header data matches a predetermined and/or preconfigured pattern (455, Yes), proxy MS server 130 may increment the values of RWC, DBRC and CBRC (425). Proxy MS server 130 may then evaluate the incremented values of each of DBRC and CBRC to determine if the value of DBRC and/or the value of CBRC is equal to or greater than its respective one or more predetermined and/or preconfigured threshold values (430). If proxy MS server 130 determines that the value of DBRC and/or the value of CBRC is equal to or greater than its respective one or more predetermined and/or preconfigured threshold values (430, Yes), MS server 130 may add the IP address corresponding to the requesting client 260 to a blacklist (435). If, however, proxy MS server 130 determines that neither the value of DBRC, nor the value of CBRC, is equal to or greater than its respective one or more predetermined and/or preconfigured threshold values (430, No), MS server 130 may evaluate the value of RWC to determine if the value of RWC is equal to a predetermined and/or preconfigured limit (440). If the value of RWC is equal to the limit (440, Yes), proxy MS server 130 may reset the values of RWC and DBRC to zero (445). If, however, the value of RWC is not equal to the limit (440, No), the request from client 260 may be treated as a valid request, and proxy MS server 130 may stop processing of the received response message (End).

If proxy MS server 130 determines that the "location" header data does not match a predetermined and/or preconfigured pattern (455, No), proxy MS servers 130 may increment the value of RWC by one and reset the value of CBRC to zero (460). MS server 130 may evaluate the value of RWC to determine if the value of RWC is equal to a predetermined and/or preconfigured limit (440). If the value of RWC is equal to the limit (440, Yes), proxy MS server 130 may reset the values of RWC and DBRC to zero (445). If, however, the value of RWC is not equal to the limit (440, No), the request from client 260 may be treated as a valid request, and MS proxy server 130 may stop processing of the received response message (End). In some embodiments, when proxy MS server 130 determines that the "location" header data does not match a predetermined and/or preconfigured pattern, MS server 130 may determine that the request from client 260, to which the response message from application server 120 is responsive, is not malicious. In certain instances, if there is no "location" header in a received response message having a 3xx response status code, the request from client 260 may be treated as a valid request.

If proxy MS server 130 determines that the response status code of the response received from application servers 120 is not a 3xx status code of interest (450, No), proxy MS server 130 may evaluate the received response message to determine if the response status code is a 2xx status code (465). In certain embodiments, MS server 130 may evaluate the received response to determine if the 2xx status code is a 2xx status code of interest. For example, proxy MS server 130 may determine that certain 2xx response status codes are of interest and all other 2xx status codes may be ignored. Generally, 2xx status codes may be used to signify that the action requested by client 260 was received, understood, accepted and processed successfully. The following table is provided as a representative example of possible 2xx status code. The following table is not intended to be a comprehensive list of all 2xx status code, nor is it intended to provide a list of 2xx status codes deemed to be of interest.

TABLE 3

Example 2xx Status Codes and Descriptions

| Status Code Value | Status Code Description |
|---|---|
| 200 | OK |
| 201 | Created |
| 202 | Accepted |
| 203 | Non-Authoritative Information |
| 204 | No Content |
| 205 | Reset Content |
| 206 | Partial Content |
| 207 | Multi-Status |
| 208 | Already Reported |
| 226 | IM Used |

If proxy MS server 130 determines that the response status code of the response message is a 2xx status code of interest (465, Yes), proxy MS server 130 may evaluate the "payload" of the response message to determine if it matches a predetermined and/or preconfigured pattern (470). In some embodiments, proxy MS server 130 may examine or evaluate the payload data to determine if it matches and/or contains preconfigured error messages. In still other embodiments, the response message will be treated as being responsive to a valid request when proxy MS server 130 determines that a "Content-Encoding" of the response message indicates any form of compression.

If proxy MS server 130 determines that the payload data matches a predetermined and/or preconfigured pattern (470, Yes), proxy MS server 130 may increment the values of each of RWC, DBRC and CBRC (425). Proxy MS server 130 may then evaluate the incremented value of each of DBRC and the incremented value of CBRC to determine if the value of DBRC and/or the value of CBRC is equal to or greater than its respective one or more predetermined and/or preconfigured threshold values (430). If proxy MS server 130 determines that either the value of DBRC and/or the value of CBRC is equal to or greater than a respective one or more predetermined and/or preconfigured threshold values (430, Yes), MS server 130 may add the IP address of the source client 260 to a blacklist (435). If, however, proxy MS server 130 determines that neither the value of DBRC, nor the value of CBRC, is equal to or greater than its respective one or more predetermined and/or preconfigured threshold values (430, No), proxy MS server 130 may evaluate the value of RWC to determine if RWC is equal to a preconfigured and/or predetermined limit (440). If the value of RWC is determined to be equal to the limit (440, Yes), proxy MS server 130 may reset the values of RWC and DBRC to zero (445). If, however, the value of RWC is not equal to the limit (440, No), the request from client 260 will be treated as a valid request, and proxy MS server 130 may stop processing of the response message (End).

If proxy MS server 130 determines that the payload data does not match a predetermined and/or preconfigured pattern (470, No), proxy MS server 130 may increment the value of RWC by one and reset the value of CBRC to zero (460). MS server 130 may evaluate the value of RWC to determine if the value of RWC is equal to a predetermined and/or preconfigured limit (440). If the value of RWC is equal to the limit (440, Yes), proxy MS server 130 may reset the values of RWC and DBRC to zero (445). If, however, the value of RWC is not equal to the limit (440, No), proxy MS server 130 may further determine that the request from client 260 will be treated as a valid request and stop processing of the response message (End).

If proxy MS server 130 determines that the response status code of the response message is not a 2xx status code of interest (465, No), proxy MS server 130 may increment the value of RWC by one and reset the value of CBRC to zero (460). MS server 130 may evaluate the value of RWC to determine if the value of RWC is equal to a predetermined and/or preconfigured limit (440). If the value of RWC is equal to the limit (440, Yes), proxy MS server 130 may reset the values of RWC and DBRC to zero (445). If, however, the value of RWC is not equal to the limit (440, No), and determine that the request from client 260 will be treated as a valid request. In addition, proxy MS server 130 may stop further processing of the response message received from application servers 120 (End).

While flowchart 400 of FIG. 4 illustrates evaluation of 4xx status codes, 3xx status codes, 2xx status codes, it is envisioned that the invention may be scalable in that fewer or greater than the disclosed status codes may be evaluated. Further, the order in which the status codes may be changed such that status codes are evaluated in the order of 3xx status codes, 4xx status codes, and 2xx status codes, the order of 2xx status codes, 4xx status codes, and 3xx status codes, the order of 2xx status codes, 3xx status codes, and 4xx status codes, etc. In certain embodiments, the number and/or order of evaluation may be determined based on a balancing of the perceived benefits (e.g., increased mitigation of DoS attacks, improved pattern creation, etc.) versus the perceived costs (e.g., increased use of computation resources, increased processing and transmission times, etc.).

Figure 5:
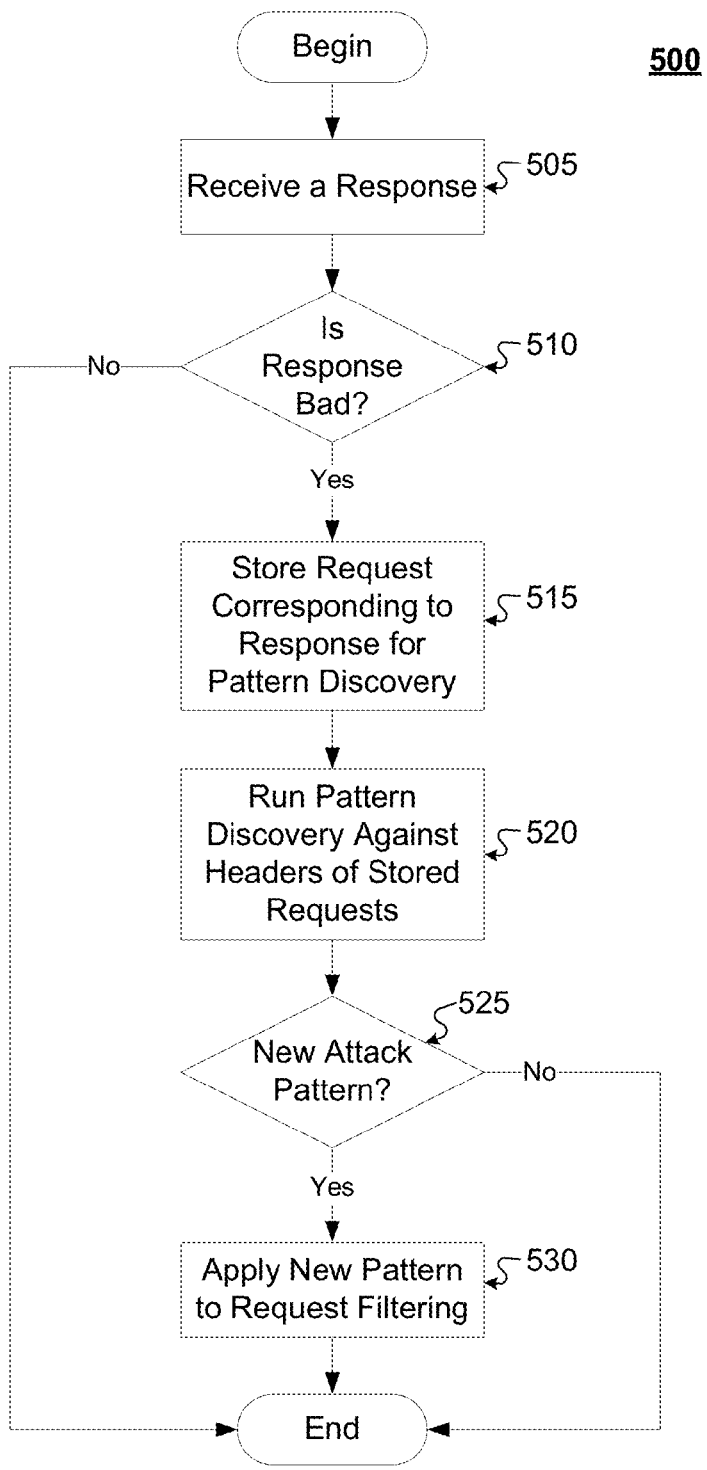
FIG. 5 is a flow diagram illustrating an example method of detecting and mitigating DoS attacks, consistent with certain disclosed embodiments.

FIG. 5 is a flow diagram illustrating an example method of detecting and responding to potentially malicious requests, consistent with certain disclosed embodiments. In some embodiments consistent with the example method of FIG. 5, proxy MS servers 130 may use responses that are known to be responsive to malicious requests to heuristically create a signature for filtering similar traffic by blocking source IPs without waiting for thresholds to be reached. The disclosed embodiments allow for the creation of signatures for filtering based, in part, on known or expected behaviors from different web servers. For example, many websites return a 4XX class response code for invalid URL requests and return a 200 response code for invalid logins. The disclosed embodiments recognize patterns in these responses, and use them to deterministically identify error responses.

As shown in flowchart 500, proxy MS server 130 may receive a response message from application servers 120 (505). The response message may be sent from application servers 120 to client 260 via proxy MS server 130 in response to a request from client 260. The request from client 260 may be, for example, a URL request, a user ID request, a password request, etc. The response message received by proxy MS server 130 may be an HTTP response message, an HTTPS response message, etc.

Proxy MS server 130 may evaluate the received response message to determine if the response message is responsive to a malicious request and therefore considered a "bad" response (510). In some embodiments, proxy MS server 130 may evaluate the received response message using the embodiments disclosed above in connection with FIG. 4. If proxy MS server 130 determines that the received response is not bad (510, No), proxy MS server 130 may end processing (End).

If, however, proxy MS server 130 determines that the received response message is a bad response (510, Yes), proxy MS server 130 may store the corresponding request in a data repository for pattern discovery (515). In some embodiments, the data repository may be one or more databases 137 associated with proxy MS servers 130. Pattern discovery may include identifying a pattern associated with the stored request. Identified patterns may include, for example, repeated use of the same URIs, variations in requested URIs, variation trends in requested URIs, etc.

Proxy MS server 130 may run pattern discovery against headers of stored requests again with the input of the new request (520). If proxy MS server 130 does not find a new attack pattern (525, No), proxy MS server may end processing (End). If proxy MS server 130 finds a new attack pattern (525, Yes), proxy MS server 130 may apply the new pattern to request filtering (530). That is, proxy MS server 130 may use requests that are known to be malicious to heuristically create a signature for filtering similar traffic by blocking source IPs without waiting for thresholds to be reached.

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood, all language such as "up to," "at least," "greater than," "less than," and the like include the number recited and refer to ranges which can be subsequently broken down into subranges as discussed above. Finally, as will be understood, a range includes each individual member. Thus, for example, a group having 1-3 members refers to groups having 1, 2, or 3 members. Similarly, a group having 1-5 members refers to groups having 1, 2, 3, 4, or 5 members, and so forth.

The foregoing description, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method for mitigating a distributed denial of service (DDoS) attack, comprising:
    receiving, by a server, a response message from an application server;
    determining a source internet protocol (IP) address corresponding to a source client based on a request message received from the source client, wherein the request message received from the source client corresponds to the response message received from the application server;
    identifying, by the server, a plurality of counters corresponding to the source IP address, wherein the plurality of counters includes a consecutive bad request counter (CBRC) that is used to track a number of consecutive bad requests received from the source IP address;
    identifying, by the server, a response type of the response message; and
    causing a value of at least one of the plurality of counters to change based on the response message and the response type.

2. The computer-implemented method of claim 1, wherein the response type is a status code of the response message, and the plurality of counters includes a discrete bad request counter (DBRC) that is used to track a number of bad requests received from the source IP address.

3. The computer-implemented method of claim 2, further including:
    determining, by the server, if the status code of the response message is a 4xx status code of interest;
    upon determining that the status code is the 4xx status code of interest, incrementing the CBRC and the DBRC;
    comparing, by the server, the CBRC that has been incremented against a CBRC threshold;
    comparing, by the server, the DBRC that has been incremented against a DBRC threshold; and
    adding, by the server, the source IP address corresponding to the source client to a blacklist based on at least one of the comparing the CBRC that has been incremented against the CBRC threshold and the comparing the DBRC that has been incremented against the DBRC threshold.

4. The computer-implemented method of claim 2, further including:
    determining, by the server, if the status code of the response message is a 3xx status code of interest;
    upon determining that the status code is the 3xx status code of interest, evaluating header data of the response message; and
    determining, by the server, if a location data in the header data matches a predetermined location pattern.

5. The computer-implemented method of claim 4, further including:
    upon determining that the location data does not match the predetermined location pattern, resetting the CBRC to zero.

6. The computer-implemented method of claim 4, further including:

upon determining that the location data matches the predetermined location pattern, incrementing the CBRC and the DBRC;

comparing, by the server, the CBRC that has been incremented against a CBRC threshold;

comparing, by the server, the DBRC that has been incremented against a DBRC threshold; and performing, by the server, a mitigating action in connection with the source client based on at least one of the comparing the CBRC that has been incremented against the CBRC threshold and the comparing the DBRC that has been incremented against the DBRC threshold.

7. The computer-implemented method of claim 2, further including:

determining, by the server, if the status code of the response message is a 2xx status code of interest;

upon determining that the status code is the 2xx status code of interest, evaluating payload data of the response message; and determining, by the server, if the payload data matches a predetermined payload data pattern.

8. The computer-implemented method of claim 7, further including:

upon determining that the payload data does not match the predetermined payload data pattern, resetting the CBRC to zero.

9. The computer-implemented method of claim 7, further including:

upon determining that the payload data matches the predetermined payload data pattern, incrementing the CBRC and the DBRC;

comparing, by the server, the CBRC that has been incremented against a CBRC threshold;

comparing, by the server, the DBRC that has been incremented against a DBRC threshold; and performing, by the server, a mitigating action in connection with the source client based on at least one of the comparing the CBRC that has been incremented against the CBRC threshold and the comparing the DBRC that has been incremented against the DBRC threshold.

10. The computer-implemented method of claim 1, wherein the response message is one of a hypertext transfer protocol (HTTP) message or a hypertext transfer protocol secure (HTTPS) message, and the response type is one of an HTTP status code or an HTTPS status code.

11. A computer-implemented method for mitigating a distributed denial of service (DDoS) attack, comprising:

receiving, by a server, a response message from an application server;

determining, from a request message corresponding to the response message, a source internet protocol (IP) address corresponding to a source client;

locating, by the server, a plurality of counters corresponding to the source IP address, including a rolling window counter (RWC) that is used to track a number of total requests received from the source IP address, a discrete bad request counter (DBRC) that is used to track a number of bad requests received from the source IP address, and a consecutive bad request counter (CBRC) that is used to track a number of consecutive bad requests received from the source IP address;

identifying, by the server, a response type of the response message;

determining, by the server, if the response message corresponds to a malicious request based on the response type and the source IP address; and causing a value of at least one of the plurality of counters to change based on the determining if the response message corresponds to the malicious request.

12. The computer-implemented method of claim 11, wherein the response type is a status code, further including:

determining, by the server, if the status code of the response message is a status code of interest; and upon determining that the status code is not a status code of interest, resetting the CBRC to zero.

13. The computer-implemented method of claim 12, wherein determining if the status code of the response message is the status code of interest, further includes:

determining, by the server, if the status code of the response message is one of a 4xx status code of interest, a 3xx status code of interest, or a 2xx status code of interest.

14. The computer-implemented method of claim 13, further including:

upon determining that the status code is the 4xx status code of interest, incrementing the CBRC and the DBRC;

comparing, by the server, the CBRC that has been incremented against a CBRC threshold;

comparing, by the server, the DBRC that has been incremented against a DBRC threshold; and performing, by the server, a mitigating action in connection with the source client based on at least one of the comparing the CBRC that has been incremented against the CBRC threshold and the comparing the DBRC that has been incremented against the DBRC threshold.

15. The computer-implemented method of claim 13, further including:

upon determining that the status code is the 3xx status code of interest, evaluating header data of the response message;

determining, by the server, if a location data in the header data matches a predetermined location pattern;

upon determining that the location data matches the predetermined location pattern, incrementing the CBRC and the DBRC;

comparing, by the server, the CBRC that has been incremented against a CBRC threshold;

comparing, by the server, the DBRC that has been incremented against a DBRC threshold; and performing, by the server, a mitigating action in connection with the source client based on at least one of the comparing the CBRC that has been incremented against the CBRC threshold and the comparing the DBRC that has been incremented against the DBRC threshold.

16. The computer-implemented method of claim 13, further including:

upon determining that the status code is the 2xx status code of interest, evaluating payload data of the response message;

determining, by the server, if the payload data matches a predetermined payload data pattern;

upon determining that the payload data matches the predetermined payload data pattern, incrementing the CBRC and the DBRC;

comparing, by the server, the CBRC that has been incremented against a CBRC threshold;

comparing, by the server, the DBRC that has been incremented against a DBRC threshold; and performing, by the server, a mitigating action in connection with the source client based on at least one of the comparing the CBRC that has been incremented against the CBRC threshold and the comparing the DBRC that has been incremented against the DBRC threshold.

17. The computer-implemented method of claim 11, wherein the response message is one of a hypertext transfer protocol (HTTP) message or a hypertext transfer protocol secure (HTTPS) message, and the status code is one of an HTTP status code or an HTTPS status code.

18. A computer-implemented method for mitigating a distributed denial of service (DDoS) attack, comprising:
- receiving, by a server, a response message corresponding to a source client, wherein the response message is one of a hypertext transfer protocol (HTTP) message or a hypertext transfer protocol secure (HTTPS) message;
- determining, from a request message corresponding to the response message, a source internet protocol (IP) address corresponding to the source client;
- locating, by the server, a plurality of counters corresponding to the source IP address, the plurality of counters including a discrete bad request counter (DBRC) that is used to track a number of bad requests received from the source IP address, and a consecutive bad request counter (CBRC) that is used to track a number of consecutive bad requests received from the source IP address;
- identifying, by the server, a status of the response message;
- determining, by the server, if the response message corresponds to a malicious request based on the status of the response message and the source IP address;
- causing a value of at least one of the plurality of counters to change based on the determining if the response message corresponds to the malicious request; and
- performing a mitigating action in connection with the source IP address based on the determining if the response message corresponds to the malicious request and at least one of a value of the DBRC and a value of the CBRC.

19. The computer-implemented method of claim 18, wherein the status is one of an HTTP status code or an HTTPS status code, further including:
- determining, by the server, if the status code of the response message is one of a 4xx status code of interest, a 3xx status code of interest, or a 2xx status code of interest; and
- upon determining that the status code is not a status code of interest, resetting the CBRC to zero.

20. The computer-implemented method of claim 19, further including:
- upon determining that the status code is the 4xx status code of interest:
- incrementing the CBRC and the DBRC;
- upon determining that the status code is the 3xx status code of interest:
- evaluating header data of the response message,
- determining, by the server, if a location data in the header data matches a predetermined location pattern, and
- incrementing the CBRC and the DBRC when the location data matches the predetermined location pattern;
- upon determining that the status code is the 2xx status code of interest:
- evaluating payload data of the response message,
- determining, by the server, if the payload data matches a predetermined payload data pattern, and
- incrementing the CBRC and the DBRC when the payload data matches the predetermined payload data pattern;
- comparing, by the server, the CBRC that has been incremented against a CBRC threshold;
- comparing, by the server, the DBRC that has been incremented against a DBRC threshold; and
- adding, by the server, the source IP address corresponding to the source client to a blacklist based on at least one of the comparing the CBRC that has been incremented against the CBRC threshold and the comparing the DBRC that has been incremented against the DBRC threshold.

21. The computer-implemented method of claim 2, wherein the plurality of counters further includes a rolling window counter (RWC) that is used to track a number of total requests received from the source IP address.

* * * * *